United States Patent
Flepp et al.

(10) Patent No.: US 6,555,243 B2
(45) Date of Patent: Apr. 29, 2003

(54) THERMOPLASTIC MULTILAYER COMPOSITES

(75) Inventors: Albert Flepp, Domar (CH); Michael Hoffmann, Tamins (CH)

(73) Assignee: EMS-Chemie AG, Domat/EMS (CH)

( * ) Notice: Subject to any disclaimer, the term of this patent is extended or adjusted under 35 U.S.C. 154(b) by 0 days.

(21) Appl. No.: 09/862,476

(22) Filed: May 23, 2001

(65) Prior Publication Data

US 2002/0012806 A1 Jan. 31, 2002

(30) Foreign Application Priority Data

Jun. 9, 2000 (DE) .......................... 100 28 558
Mar. 7, 2001 (DE) .......................... 101 10 964

(51) Int. Cl.[7] .......................... B32B 27/08; B29C 22/00; F16L 11/04
(52) U.S. Cl. .................. 428/474.4; 428/35.7; 428/36.6; 428/36.7; 428/36.91; 428/411.1; 428/476.1; 264/171.27; 264/173.12; 264/209.1; 264/209.5; 264/508; 264/510; 264/512; 264/513; 264/514; 264/515; 138/118; 138/121; 138/124; 138/125; 138/140; 138/141; 138/DIG. 1; 138/DIG. 7
(58) Field of Search ............... 428/36.6, 474.4, 428/35.7, 36.91, 36.7, 411.1, 476.1; 138/118, 121, 124, 125, 140, 141, DIG. 7, DIG. 1; 264/171.27, 173.12, 209.1, 209.5, 508, 510, 512, 513; 764/514, 515

(56) References Cited

U.S. PATENT DOCUMENTS

| | | | |
|---|---|---|---|
| 4,407,873 A | | 10/1983 | Christensen et al. |
| 5,038,833 A | * | 8/1991 | Brunnnhofer ................ 138/137 |
| 5,076,329 A | * | 12/1991 | Brunnhofer ................ 138/137 |
| 5,167,259 A | * | 12/1992 | Brunnhofer ................ 138/137 |
| 5,219,003 A | * | 6/1993 | Kerschbaumer ............ 138/137 |
| 5,425,974 A | * | 6/1995 | von Widdern et al. ..... 428/35.4 |
| 5,443,874 A | * | 8/1995 | Tachi et al. ................. 428/36.7 |
| 5,460,771 A | * | 10/1995 | Mitchell et al. ............. 264/508 |
| 5,469,892 A | * | 11/1995 | Noone et al. ................ 138/121 |
| 5,491,009 A | | 2/1996 | Bekele |
| 5,706,865 A | | 1/1998 | Douchet |
| 5,804,670 A | * | 9/1998 | Stoeppelmann ............. 525/420 |
| 5,869,157 A | * | 2/1999 | Stoeppelmann .......... 428/36.91 |
| 5,869,190 A | * | 2/1999 | Stoeppelmann .......... 428/474.4 |
| 6,379,812 B1 | * | 4/2002 | Hofmeister et al. ....... 428/34.1 |

FOREIGN PATENT DOCUMENTS

| | | |
|---|---|---|
| DE | 35 10 395 A1 | 9/1986 |
| DE | 40 01 125 C1 | 12/1990 |
| DE | 41 30 486 A1 | 2/1993 |
| DE | 195 29 603 A1 | 2/1997 |
| DE | 195 37 003 A1 | 4/1997 |
| DE | 198 06 468 A1 | 8/1999 |
| DE | 695 14 645 T2 | 9/2000 |
| EP | 0 246 102 A2 | 11/1987 |
| EP | 0 428 833 A2 | 5/1991 |
| EP | 0 445 706 A2 | 9/1991 |
| EP | 0 692 374 A1 | 1/1996 |
| EP | 1 036 968 A1 | 9/2000 |

* cited by examiner

Primary Examiner—P. Hampton-Hightower
(74) Attorney, Agent, or Firm—Browdy and Neimark, P.L.L.C.

(57) ABSTRACT

Thermoplastic multilayer composite, particularly in the form of a multilayer hose, a multilayer pipe or a multilayer container, containing at least one intermediate layer made of a molding compound on the basis of ethylene/vinyl alcohol copolymers between layers made of molding compounds on the basis of polyamide, the intermediate layer being bonded via at least one adhesion-promoting layer made of a molding compound on the basis of polyamide selected from the group of copolyamide 6/12, block copolyamide 6/12, polyamide 612, polyamide 610, a mixture of polyamide 6 and polyamide 12 with compatibilizer, a mixture of polyamide 6 and polyamide 11 with compatibilizer, with at least one neighboring layer made of a molding compound on the basis of polyamide 12, polyamide 11, polyamide 1010, polyamide 1012, or polyamide 1212.

15 Claims, 2 Drawing Sheets

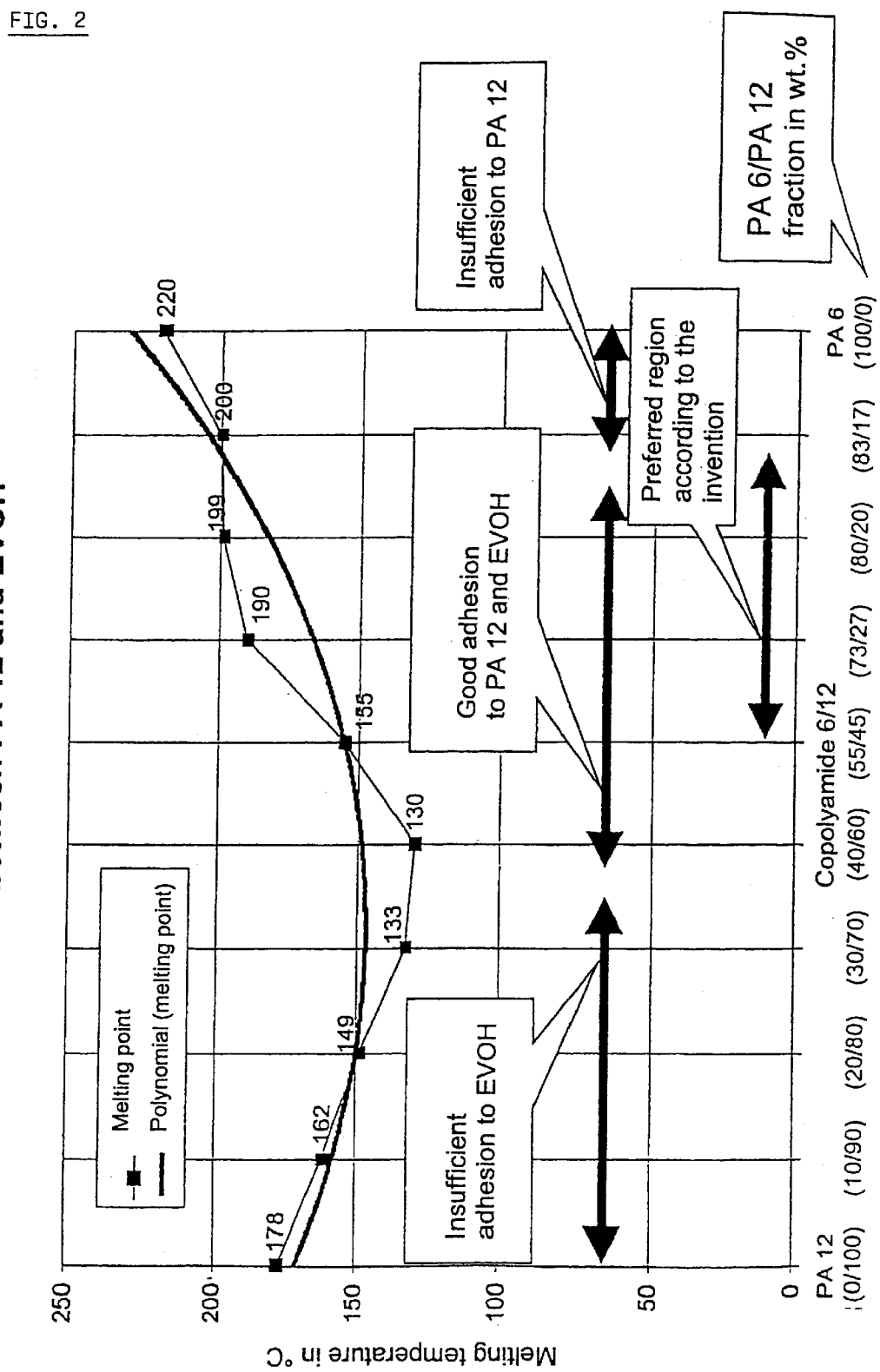

US 6,555,243 B2

THERMOPLASTIC MULTILAYER COMPOSITES

FIELD OF THE INVENTION

The present invention refers to thermoplastic multilayer composites, particularly in the form of a multilayer hose, a multilayer pipe which more particularly can be a fuel line, or a multilayer container, containing at least one layer of a molding compound on the basis of ethylene/vinyl alcohol copolymers and layers of molding compounds on polyamide basis, as well as to methods of production thereof.

The invention refers in particular to hose lines or tubing for gaseous or liquid media consisting of plural polymer layers and exhibiting an improved barrier action specifically toward fuels. These fuels may also contain alcoholic components. Therefore, the multilayer motor vehicle tubing according to the invention also relates to the conduction of alcoholic media. These tubings are supposed to be alcohol-resistant, which means that the plastic pipe will not experience a disturbing elongation when conducting a fuel containing alcohol. Such a conduit is supposed to be suitable for conducting premium gasoline with an alcohol content of 5% and possibly more, without significant elongation. In ordinary linguistic usage, the term alcohol more particularly means methyl alcohol as well as ethyl alcohol and their mixtures with water, but also the higher-valent alcohols. In this connection, the term alcoholic medium designates, not only fuel with alcohol addition but also for instance liquids of a windscreen washer unit or pressurized media of a brake system.

BACKGROUND OF THE INVENTION

Already in the 1990s, known multilayer motor vehicle tubings have better satisfied enhanced safety requirements and tightened environmental regulations than polyamide monolayer pipes used earlier. This had also found a reflection in German standards DIN 73378 and DIN 74342.

Disturbing effects are triggered when alcohol is present in the medium to be conveyed in such tubing. The polyamide coming in direct contact with the alcohol somewhat swells, implying dimensional increases of 5–10%. However, the polyamide is also extracted by the alcohol, i.e., monomers, oligomers, plasticizers, stabilizers etc. are leached and transfer into the alcohol medium. The properties of the pipe thus change over time. Moreover, at lower temperatures the leached monomers and oligomers may precipitate and lead to clogging in the gasoline system (for instance in filters and nozzles). This phenomenon is apparent in particular with polyamide 11 and polyamide 12.

Previously known multilayer motor vehicle tubings had been satisfactory so long as the medium conveyed by them did not contain alcohol.

For this reason one could also perceive to use other plastic materials for the motor vehicle tubings, that is alcohol resistant ones, instead of the polyamide material. However, these do not satisfy the special requirements with respect to the systems used to convey media in motor vehicle construction, which range from lowest permeabilities for the media to superior mechanical stability with a low-temperature impact resistance of −40° C. to 100° C. and to high chemical resistance under the effect of highway salt.

The standard DIN 73378 mentioned above is the most important European standard for pipes of polyamides for motor vehicles. For custom-tailored polyamide types, it specifies the dimensions, the bursting strength as a function of temperature up to 130° C., the impact strengths at 23° C. and −40° C., stabilization, plasticizer content, flexibility (modulus in tension), and polyamide characteristics with defined short designations. It should be noted that already in this very old DIN 73378, only modified polyamide 12 and polyamide 11 materials are admitted for pipes laid underneath the body.

Even in the USA (SAE J 844d and J 1394), Great Britain (BS 5409), and Japan (JASO M 301), only modified polyamide 12 and polyamide 11 types are admitted, for instance, for brake lines and helical tubing.

The standard requirements to be met by current fuel lines (SAE J 2260) are manifold, as indicated above. In addition to typical mechanical and chemical polyamide properties, current fuel lines for reasons of environmental and health protection must possess highest barrier properties against volatile organic compounds. According to the current state of the art, a plastic fuel line for passenger vehicles consists of several layers of material. Here the properties of several polymers are deliberately combined. This occurs by coextrusion. It is necessary in such a case that the individual layers which are in direct mutual contact are compatible, so that good adhesion can be achieved over the full lifetime of the component. Therefore, adhesion promoter must be used between incompatible polymers.

Because of their good mechanical and chemical properties in these applications, polyamides, and in particular polyamide 11 (PA 11) or polyamide 12 (PA 12), are the preferred materials used in the outer tubing layers. While polyamides by themselves exhibit good mechanical properties, and in particular a good toughness, the barrier action with respect to alcoholic fuels is insufficient. Polar substances in particular readily migrate through polyamides. In fuel lines conducting alcohol-containing fuel, for instance, this is extremely disadvantageous. In view of considerations concerning environmental protection and safety arising in recent years, this is undesirable.

Development work has been performed, therefore, in order to produce multilayer pipes with improved barrier properties. Nowadays fluoropolymers such as PVDF and ETFE are commonly used as barrier layers. However, these materials are expensive. Even with very thin layers of this material, the material costs for the fill pipe are 40 to 60% higher than with a single-layer pipe of PA 11 or PA 12. Moreover, when fluoropolymers are used, additional safety precautions for man and environment are needed, both during processing and during elimination after product use.

Ethylene/vinyl alcohol copolymers, abbreviated EVAL or, in the English-speaking world, also designated as EVOH, are known barrier materials for nonpolar and polar solvents, and are proposed as barrier layers for multilayer motor vehicle lines (cf. DE 35 10 395 A1, DE 38 27 092 C1, and EP 0 428 834 A2). However, in practice the multilayer fuel lines with ethylene/vinyl alcohol copolymers as the barrier layers are hardly used, since a few years ago the availability of EVOH was still very limited. For EVOH to retain its excellent barrier properties, it must be protected against moisture. Therefore, it is preferably used as an intermediate layer not in direct contact with the fluid. It is further known that EVOH in a pure form can only be used in small layer thicknesses. In fact, ethylene/vinyl alcohol copolymers having the required barrier properties are known as extraordinarily brittle with low strain at break.

According to Kunststoff Taschenbuch of Saechtling, 26th edition, typical EVAL barrier types have a VAL (vinyl alcohol) content of 53 to 68% by weight. It follows that these materials have a considerable capacity for moisture uptake. It is described that these EVAL types lose their barrier effect at water contents of 3 to 8%. Saechtling recommends, therefore, to use EVAL as a multilayer film between PE (polyethylene), PP (polypropylene) and PA (polyamide) or PET (polyethylene terephthalate).

It would be desirable to find suitable polymers providing good, stable adhesion simultaneously to EVOH and to polyamides such as PA 11 and PA 12 of a multilayer composite. Here the EVOH interlayer, as already described in EP 0 428 833 B1, in addition to its major function as a barrier layer with respect to the medium (e.g., the fuel) has the second function that monomers, oligomers, and other substances from this layer and the layers disposed toward the outside will not dissolve in the transport medium (hence the additional designation of "dissolution inhibitor layer").

EP 0 428 833 B1 (Technoflow), corresponding to DE 40 01 125 C1, describes five-layer motor vehicle tubings for alcohol-containing media consisting of an outer layer of polymers PA 11 or PA 12, an intermediate layer of PA 6, a dissolution inhibitor interlayer of EVAL, and an inner layer of PA6. The PA 6 and EVAL adhere without an adhesion promoter in direct contact with each other. As a fifth layer between PA 6 and PA 12, the tubing described contains an adhesion promoter on the basis of polyethylene or polypropylene with active side chains. According to EP 0 428 833 B1, the preferred EVAL types have an ethylene fraction of 30 to 45%. Therefore, according to EP 0 428 833 B1, two adhesion promoter layers respectively consisting of polyamide 6 and polyolefin are required in order to bond EVAL with polyamide 12.

EP 0 428 834 A2 (Technoflow), corresponding to DE 40 01 126 C1, describes three-layer fuel lines with ethylene/vinyl alcohol copolymer (EVAL) as the inner, PA 11 or PA 12 as the outer layer. Polyethylene or polypropylene with active side chains are proposed as the adhesion promoter between EVAL and the polyamide 11 or 12.

DE-OS 35 10 395 (Technoflow) describes three-layer fuel lines with ethylene/vinyl alcohol copolymer (EVAL) as an alcohol barrier. DE-OS 35 101 395 already recognizes the need to protect EVAL against moisture uptake. As a solution for this purpose, polyamide and, specifically, PA 1 and PA 12 are suggested as water barrier layer. According to DE-OS 35 10 395, no adhesion promoter is envisaged between EVAL and PA 11 or PA 12. However, in practice this will not produce sufficient adhesion between the layers. As a result, the layers of the pipe delaminate, and the pipe thus loses its mechanical properties.

Kuraray Co. Ltd. in the product brochure "KURARAY EVAL RESIN", of October 1992, describes that good adhesion between EVAL and "Nylon" ostensibly is possible without adhesion promoter, but that with polyolefines an adhesion promoter be required. Neither Technoflow in DE-OS 35 10 395 nor Kuraray consider the specific adhesion problems between EVOH and PA 12.

In JP 07-308 996, multilayer composites with EVOH barrier layers are described, but it is pointed out that these have the disadvantage of a barrier effect that will decrease by stress cracking in the EVOH. According to JP 07-308 996, this disadvantage can be overcome by admixing a certain amount of copolyamide 6/12 with the EVOH. However, with less than 10% by weight of copolyamide 6/12 in the mixture the stress cracking resistance becomes insufficient while with more than 50% by weight of copolyamide 6/12 the barrier properties deteriorate. Multilayer composites with two to seven layers are also described according to JP 07-308 996. It is explained while referring to the further thermoplastic layers that amongst others, these can also consist of polyamide or polyester, and also of mixtures of polyamide 6 with polyolefins. It is further stated in JP 07-308 996 that in the copolyamide 6/12, a copolymerization ratio of caprolactam to laurolactam in the range between 85:15 to 55:45 is preferred.

In EP 0 731 308 B1 (ELF ATOCHEM), multilayer motor vehicle tubings with an inner layer of a modified polyamide are described in which a polyolefin is dispersed as impact strength modifier. The polyamide matrix consisting of polyamide 6 is the major component (65%). In it a copolymer of ethylene/butene as well as a copolymer of ethylene/ethyl acrylate/maleic anhydride are dispersed. The outer layer of the tubing consists of polyamide 12; an EVOH layer is disposed between the inner and outer layer and a further adhesion promoter layer.

EP 0 617 219 A2 (Technoflow) describes multilayer motor vehicle tubings produced by coextrusion which contain EVOH, polyamide and/or PBT (polybutylene terephthalate) as the barrier layer plastics. According to EP 0 617 219, however, at least two thin barrier layer/laminate films must be employed which can consist of the same or different materials, and these barrier layer films are incorporated into the composite with adhesion promoter films. This multilayer structure of the laminate makes it possible to have considerable bending deformations of such a pipe even with brittle barrier plastics, in particular when the adhesion promoter films are adapted to compensate shear stresses.

U.S. Pat. No. 5,469,892 (ITT) describes fuel lines with at least three layers and a corrugated region, i.e., corrugated walls. The fuel lines can have up to a maximum of five layers. Polyamide 12 is named as the preferred material for the outer layer; polyamide 6 is cited as the preferred material for the inner layer which, moreover, can be finished so as to be electric conductive. The multilayer tubing according to U.S. Pat. No. 5,469,892 can also contain intermediate layers not consisting of polyamide but having barrier properties toward fuel hydrocarbons. A PBT and/or EVOH layer is mentioned as the barrier layer.

U.S. Pat. No. 5, 460,771 (ITT) which corresponds to EP 0 743 894 B1 and DE 695 14 645 T2 describes a method for the production of corrugated pipe for fuel transport having three or more layers. Apart from fluoropolymers, different polyamides (PA 6, PA 11, PA 12) are cited as material for the inner layer, while the outer layer may consist of polyamide 12 or polyamide 11. As an alternative to the fluoropolymer barrier layers, intermediate barrier layers may consist of EVOH. However, nothing is proposed as regards the problem of insufficient adhesion between EVOH and PA 12 or PA 11.

Preshaped fuel lines are used in the motor vehicle industry in order to attain rational assembly operations. To this end the plastic pipes are thermoformed, that is, permanently formed under the action of heat. This operation preferably is carried out with hot air, oil, infrared, or steam. High production economy is achieved with steam at temperatures in the range of 140 to 160° C. However, this high thermal load requires an optimum adhesive strength and resistance to high temperatures of the pipe materials used.

SUMMARY OF THE INVENTION

It is an object of the present invention, therefore, to provide an inexpensive thermoplastic multilayer composite, in particular a multilayer fuel line with barrier action for the automotive industry which does not use fluoropolymers while making possible a simple production and further processing. An optimum bond strength and resistance to high temperatures of the pipe materials shall be provided in particular, even under high thermal load such as present during thermoforming.

It has now been surprisingly found that polyamides from the group of copolyamide 6/12 with 60 to 80% by weight of caprolactam (in the following text designated as the polyamide 6 fraction), block copolyamide 6/12, homopolyamide 612 (=polyamide 612), polyamide 610, a mixture of polyamide 6 and polyamide 12 with a compatibilizer, a mixture of polyamide 6 and polyamide 11 with a compatibilizer, will secure good, steady and durable adhesion, both to EVOH and to polyamide 12 or polyamide 11. For the copolyamide 6/12, a polyamide 6 fraction of 65 to 80% by weight is particularly preferred.

The present invention is therefore directed to a thermoplastic multilayer composite containing at least one intermediate layer made from a molding compound on the basis of ethylene/vinyl alcohol copolymers, between layers made from molding compounds on the basis of polyamide, as well as at least on one side of the intermediate layer a neighboring layer made from a molding compound on the basis of polyamide 12, polyamide 11, polyamide 1010, polyamide 1012, or polyamide 1212, characterized in that between the at least one neighboring layer and the intermediate layer an adhesion-promoting layer is provided which is made from a molding compound on the basis of polyamide selected from the group consisting of copolyamide 6/12 with 60 to 80% by weight of polyamide 6 fraction, block copolyamide 6/12, polyamide 612, polyamide 610, a mixture of polyamide 6, polyamide 12, and a compatibilizer, a mixture of polyamide 6, polyamide 11 and a compatibilizer, wherein the quantity of polyamide in the adhesion-promoting layer is at least 60% by weight.

Multilayer composites according to the invention contain at least one intermediate layer consisting of a molding compound on the basis of ethylene/vinyl alcohol copolymers between layers of molding compounds on the basis of polyamide (where the term polyamide is understood as covering homopolyamides, copolyamides and mixtures of homopolyamides and/or copolyamides), the intermediate layer being bonded on at least one side via an adhesion-promoting layer consisting of a molding compound on the basis of the aforementioned group of polyamides based in part on 6 carbon atoms units, to at least one layer consisting of a molding compound on the basis of polyamide 12 or polyamide 11. Apart from polyamide 12 or polyamide 11, in this latter layer one can also use polyamide 1010, polyamide 1012, or polyamide 1212, which also display insufficient adhesion to EVOH.

The multilayer composites according to the invention can have the form of a multilayer hose, multilayer pipe, or multilayer container.

Relative to the EVOH intermediate layer, the layer structure on both sides may be different or alike.

When using one of the polyamide mixtures mentioned as the adhesion-promoting molding compound, the content of polyamide 6 preferably is between 25 and 80 parts by weight, based on 100 parts by weight of the two polyamides together.

In a particular embodiment of the invention, the adhesion-promoting polyamides selected were those having a melting point above 150° C. in order to escape limitations in thermoforming.

In a preferred embodiment of the invention, the thermoplastic multilayer composite consists of an inner layer (a) made of a molding compound on the basis of polyamide 6, polyamide 46, polyamide 66, polyamide 69, polyamide 610 or polyamide 612, which all adhere directly to the EVOH, followed by a layer (b) made of a molding compound on the basis of ethylene/vinyl alcohol copolymers, an adhesion-promoting layer (c) made of a molding compound on the basis of the adhesion-promoting polyamides cited above, the polyamide 6 fraction being 60 to 80 % by weight in the case of polyamide 6/12, and an outer layer (d) made of a molding compound on the basis of polyamide 12 or polyamide 11.

In a particularly preferred embodiment of the invention, the inner layer (a) is provided with antistatic agents such as carbon black, carbon fibers, graphite fibers, metal powder or fibers, etc., so that the inner layer becomes electric conductive. However, to this end one can also provide an additional thin fifth inner layer on the basis of the polyamides of layer (a) which has been made electric conductive by antistatic agents. Having such an additional innermost layer is cheaper than an antistatic finish of a thicker layer (a).

It is of course also possible within the scope of the present invention to antistatically finish the inner layer of the multilayer composite, which layer is not restricted to the polyamides mentioned previously under (a) above. Thus, one can also have a symmetric structure so to speak with five layers where EVOH is the central layer and PA 12 is the outer and inner layer, and between each of them an adhesion-promoting layer according to the invention. The inner polyamide 12 layer can then have an electric conductive finish, particularly with carbon fibers or conducting carbon black.

The polyamide molding compounds of the thermoplastic multilayer composite according to the invention may further contain one or more rubbers for improving the impact strength. Such rubbers, also called impact strength modifiers, have for instance been described in EP 0 654 505 A1, from page 4, line 38, to page 5, line 58, and are very well known to those skilled in the art from this detailed listing. Such impact strength modifiers have in common that they contain an elastomer fraction and have at least one functional group that can react with the polyamide, for instance a carboxylic acid or carboxylic anhydride group.

Impact strength modifiers are produced by grafting or copolymerising the starting polymers with suitable reactive compounds such as maleic anhydride, (meth)acrylic acid, or glycidyl (meth)acrylate. Therefore, impact strength modifiers often can be described as grafted copolyolefins. Mixtures of different impact strength modifiers can also be used.

It follows from the affinity of the impact strength modifiers to the polyamides which arises from the functional groups that in the adhesion-promoting layer according to the invention used in the case of polyamide mixtures, these very impact strength modifiers can at the same time function as compatibilizers. Acid-modified ethylene/α-olefin copolymers are preferentially used in the present invention. Other suitable compatibilizers for the adhesion-promoting layer according to the invention are, for instance, block copolyamides such as block copolyamide 6/12.

The content of compatibilizer in the mixtures is preferably as high up to 30% by weight, and particularly preferably 5 to 15% by weight.

Aside from the antistatic agents for the inner layer or an additional innermost layer, the polyamide molding compounds can also contain a flame-retardant additive as well as further additives such as pigments, oligomers and polymers, stabilizers and processing aids as well as reinforcing agents (e.g., glass fibers). The fraction of the reinforcing agents can be Up to 50% by weight, that of the flame retardants can be up to 15% by weight, and that of all other additives together up to 5 % by weight, always based on the entire molding compound.

In a variant intended to enhance the barrier properties, the polyamide compounds used for the layers of the thermoplastic multilayer composites according to the invention can be filled with layer silicates. In the resulting layers one finds not only an improved permeability behavior but also an improved strength, dimensional stability in the heat, and stiffness without a deterioration in toughness and strain at break such as found for the usual fillers, for instance glass fibers or minerals. According to the present invention, therefore, at least one of the layers of the multilayer composite and preferably also the molding compound for the intermediate layer on the basis of ethylene/vinyl alcohol copolymers may contain layer silicates in the polymer matrix. Since layer silicates readily swell and the cations present in the layer planes can be exchanged; the mineral can be incorporated into the polyamide and/or ethylene/vinyl alcohol copolymer in a nanofine distribution during polycondensation or polymerization or during the saponification (hydrolysis) of the ethylene/vinyl acetate copolymer.

The content of layer silicates in the polymer matrix can be 0.5 to 50 parts by weight per 100 parts by weight of the polymer matrix. Layer silicates to be considered are, for instance, clay minerals of the montmorillonite series such as montmorillonite, hectorite, nontronite, saponite, and vermiculite, since these clays have a high base exchange capacity. The production of polyamide-layer silicate nanocomposites has been known since the 1970s, e.g. DE 36 32 865 C2.

Considering the additives, the quantity of polyamide in the adhesion-promoting layer is always at least 60% by weight, preferred at least 70% by weight and more preferred at least 80% by weight.

The multilayer composites according to the invention can be produced in one or several steps. In one-step processes the components are processed simultaneously, for instance by (co)extrusion, (multicomponent) injection molding or extrusion blow molding. In the one-step extrusion process, for instance, the different melts are coextruded. In multistep processes, at least one component is first brought into the desired shape by thermoplastic processing, and then the other components are applied to it, for instance by pressing, injection molding (for instance back injection), extruding or extrusion blow molding (for instance sequential extrusion blow molding).

Thus, multilayer tubings according to the invention can be produced in a coextrusion process (simultaneously) or in a casing process (two steps). In the casing process, at least one layer is applied to a precalibrated pipe consisting of inner layers.

The multilayer composites according to the invention are primarily used as construction components in the mechanical engineering and automobile industry. The multilayer composites according to the invention are used in particular as multilayer pipes, preferentially as fuel lines such as diesel fuel or gasoline lines, or as fuel tank inlets. Applications in the food sector are also conceivable, provided the regulations for contact with food are respected, for instance hoses or pipes for the transport of alcoholic beverages. The multilayer composite according to the invention can also be in the form of a hollow body or container for the storage of liquid media from the cited applications, for instance in the form of a bottle, can, or tank, collectively called multilayer containers.

The multilayer composites according to the invention, and particularly the motor vehicle tubings according to the invention, preferably consist of four layers or, with an additional inner antistatic layer, of five layers.

DESCRIPTION OF THE DRAWING

FIG. 2 is a graph of comparative results.

DESCRIPTION OF THE PREFERRED EMBODIMENTS

Figure 1:
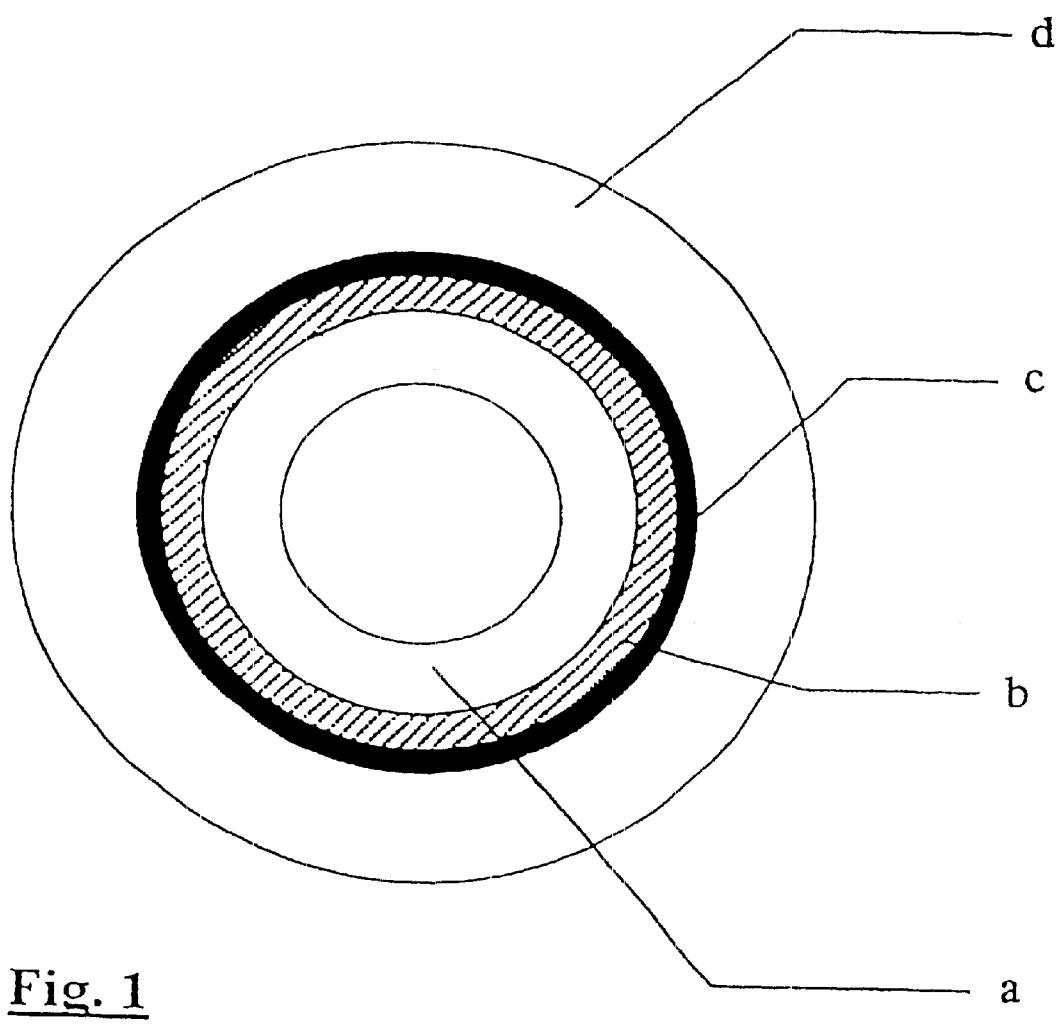
FIG. 1 shows schematically and in cross section, a four-layer fuel line according to the invention produced from plastic by coextrusion. Here the reference symbols signify:
   a: inner layer
   b: barrier and dissolution inhibition layer
   c: adhesion-promoting intermediate layer
   d: outer layer.

Frequently, fuel lines for automobiles have dimensions of 8×1 mm, i.e., 8 mm outer diameter and a wall thickness of 1 mm. A preferred fuel line according to the invention is now built up as follows, for instance, without being limited to this structure:
   a: inner layer consisting of a molding compound on the basis of polyamide 6; 0.2 to 0.7 mm thick,
   b: barrier and dissolution inhibitor layer consisting of a molding compound on the basis of an ethylene/vinyl alcohol copolymer; 0.1 to 0.3 mm thick,
   c: adhesion-promoting intermediate layer on the basis of a molding compound of polyamide, selected from the group of copolyamide 6/12 with 55 to 80% by weight of polyamide 6 fraction, block copolyamide 6/12, polyamide 612, mixture of polyamide 6 and polyamide 12 with compatibilizer, and polyamide 610; 0.05 to 0.2 mm thick,
   d: outer layer consisting of a molding compound on the basis of polyamide 12; 0.2 to 0.7 mm thick.

When varying the individual layer thicknesses is practice, there is usually paid attention to arrive a total wall thickness of about 1 mm or slightly more.

In the following, the experiments performed are explained in detail, describing first the materials used in them, without restricting the invention to the used material types or provenances.

Materials Used
   a) for the inner layer:
      Grilone® BRZ 247 WCA: a polyamide 6, made impact-resistant and plasticized, of EMS-CHEMIE AG, Domat/Ems, Switzerland (also suitable: the less viscous type Grilon® BRZ 234 WCA);
   b) for the barrier and inhibitor layer:
      EVAL® EP-F 101A: ethylene/vinyl alcohol copolymer, a product of KURARAY;
   d) for the outer layer:
      Grilamid® L 25 W 40 CA: a polyamide 12, made impact-resistant and plasticized, of EMS-CHEMIE AG, Domat/Ems, Switzerland (also suitable: the type Grilamid® L 25 W 20 CA, containing less plasticizer)
   c) for the adhesion-promoting intermediate layer:
      Admer® QB 510 E: a polypropylene grafted with maleic anhydride, a product of MITSUI;

Grilon® A 6059M: a copolyamide 6/12 with 10% by weight polyamide 6 fraction, a product of EMS-CHEMIE AG, Domat/Ems, Switzerland;

Grilon® A 6060M: a copolyamide 6/12 with 20% by weight polyamide 6 fraction, a product of EMS-CHEMIE AG, Domat/Ems, Switzerland;

Grilon® A 6061M: a copolyamide 6112 with 30% by weight polyamide 6 fraction, a product of EMS-CHEMIE AG, Domat/Ems, Switzerland;

Grilon® CF 6S: a copolyamide 6/12 with 40% by weight polyamide 6 fraction, a product of EMS-CHEMIE AG, Domat/Ems, Switzerland;

Grilon® CF 7: a copolyamide 6/12 with 55% by weight polyamide 6 fraction, a product of EMS-CHEMIE AG, Domat/Ems, Switzerland;

Grilon® CR 8: a copolyamide 6/12 with 73% by weight polyamide 6 fraction, a product of EMS-CHEMIE AG, Domat/Ems, Switzerland;

Grilon® CR 10 CA: a copolyamide 6/12 similar to the type CR 8, but modified, a product of EMS-CHEMIE AG, Domat/Ems, Switzerland;

Grilon® CR 9: a copolyamide 6/12 with 83% by weight polyamide 6 fraction, a product of EMS-CHEMIE AG, Domat/Ems, Switzerland;

Zytel® 350 PHS2-NC010: a polyamide 612 of DU PONT;

Grilon® XS 1261: a polyamide 610, a product of EMS-CHEMIE AG, Domat/Ems, Switzerland.

Grilon® C XE 3813: a mixture of 45% by weight of polyamide 6 and 45% by weight of polyamide 12 and 10% by weight of an acid-modified ethylene/α-olefin copolymer as compatibilizer, a product of EMS-CHEMIE AG, Domat/Ems, Switzerland.

The different layers were made into a composite by coextrusion. Pipes having the dimensions of 8×1 mm were produced on a commercial multilayer coextrusion machine, while varying the material used for the adhesion-promoting layer (c). The following layer thicknesses were set:

Inner layer (a): 0.35 mm

Layer(b): 0.25mm

Layer (c): 0.10 mm

Outer layer (d): 0.30 mm

The following Table 1 shows the suitability of the polyamide derivatives examined as adhesion promoters between polyamide 12 (Grilamid® L 25 W 40 CA black 9992) and EVOH (EVAL® EP-F 101A), as well as the qualitative bond strengths, both in the original state and after steam treatment.

The adhesion was checked according to SAE-XJ2260 (visual rating after mechanical deformation).

TABLE 1

| Type of adhesion promotor | Maker | Composition | Tm °C. | Adhesion to PA 12 Orig. | Adhesion to PA 12 Steam 4 min at 140° C. | Adhesion to EVOH Orig. | Adhesion to EVOH Steam 4 min at 140° C. | Rating |
|---|---|---|---|---|---|---|---|---|
| Admer® QB 510E | Mitsui | PP+ MAH Grafted | 160 | + | − | n.c. | n.c. | Adhesion to PA 12 insufficient after steam stor. |
| Grilon® A 6059M | EMS | CoPA 6/12 wt. % 10/90 | 162 | + | n.c. | − | n.c. | Adhesion orig. to EVOH insufficient |
| Grilon® A 6060M | EMS | CoPA 6/12 wt % 20/80 | 149 | + | n.c. | − | n.c. | Adhesion orig. to EVOH insufficient |
| Grilon® A 6061M | EMS | CoPA 6/12 wt. % 30/70 | 133 | + | n.c. | − | n.c. | Adhesion orig. to EVOH insufficient |
| Grilon® CF 6S | EMS | CoPA 6/12 wt. % 40/60 | 130 | n.c. | n.c. | n.c. | n.c. | Tm too low |
| Grilon® CF 7 | EMS | CoPA 6/12 wt. % 55/45 | 155 | + | + | n.c. | n.c. | large shrinkage after steam storage |
| Grilon® CR 8 | EMS | CoPA 6/12 wt. % 73/27 | 190 | + | + | + | + | Good adhesion to PA 12 and EVOH |
| Grilon® CR 10 CA | EMS | CoPA 6/12 wt. % 73/27 | 190 | + | + | + | + | Good adhesion to PA 12 and EVOH |
| Grilon® CR 9 | EMS | CoPA 6/12 wt. % 83/17 | 200 | − | n.c. | + | n.c. | Adhesion orig. to PA 12 insufficient |

TABLE 1-continued

| Type of adhesion promotor | Maker | Composition | Tm °C. | Adhesion to PA 12 Orig. | Adhesion to PA 12 Steam 4 min at 140° C. | Adhesion to EVOH Orig. | Adhesion to EVOH Steam 4 min at 140° C. | Rating |
|---|---|---|---|---|---|---|---|---|
| Zytel ® 350 PHS2-NC010 | Du Pont | PA 612 | 215 | + | + | + | + | Good adhesion to PA 12 and EVOH |
| Grilon ® XS 1261 | EMS | PA 610 | 220 | + | + | + | + | Good adhesion to PA 12 and EVOH |
| Grilon ® C XE 3813 | EMS | PA 6/ PA 12 + Compatibilizer | 222/ 178 | + | + | + | + | Good adhesion to PA 12 and EVOH |

Legend:
n.c. = not checked
Tm = melting point

In FIG. 2 with the heading "CoPA 6/12 with different composition ratios as adhesion promoters between PA 12 and EVOH", the suitabilities of the copolyamides 6/12 used according to the invention as adhesion promoters for polyamide 12 and EVOH are compiled. Here the scale of the abscissa is not strictly linear, since the difference in the composition ratio of the CoPA 6/12 types that were available was not always equidistant. For this reason the curve showing the effective melting points is somewhat distorted in part. The composition ratios (PA 6/PA 12 fraction) indicated correspond to the ratios of caprolactam to laurolactam used in making these statistical copolyamides. In addition to the types used in the adhesion tests, one more type having a PA 6 fraction of 80% by weight is entered into the diagram as a further point in the range of compositions and melting points.

In the following, the permeation rates of pipes belonging to the state of the art which were obtained in the so-called mini-SHED test (Sealed Housing for Evaporative Determination), are shown in Table 2 relative to the results for a four-layer pipe according to the invention, from tests of EG & G AUTOMOTIVE RESEARCH applying a cyclic temperature profile according to regulation CARB 95 (California law concerning hydrocarbon emissions in automobile construction).

TABLE 2

(Permeation values for test conditions according to CARB 95)

| Pipe structure from inner to outer layer | Permeation TF1 in mg/m × day |
|---|---|
| PBT/block-CoPEA/PA 12 (according to DE 196 43 143 A1) | 2 |
| PA 12/PVDF/PA 12 (general state of the art) | 3 |
| PA 6/EVOH/CoPA 6/12/PA 12 (according to the invention) | <1 |

Block CoPEA = block copolyesteramide
TF1 = test gasoline, 90% Indolene + 10% ethanol
CoPA 6/12 = copolyamide made of 73% by weight coprolactam and 27% by weight laurolactam (material Grilon ® CR 10 CA, see table 1)

In summary, it can be confined that the multilayer pipe according to the invention which from the inner to the outer layer is built up as:

PA6/EVOH/CoPA6/12/PA12, has a very good, that is, very low permeation rate.

The multilayer pipe according to the invention complies with the requirements of SAE J 2260, as could be shown in the performed tests. It is readily extrudible, and the production of corrugated pipe is also possible (so that at least some sections will have a corrugated wall). Further, it can be attested that the multilayer pipe according to the invention has high impact strength and resistance to high temperatures, since adhesion promoters on the basis of polyethylene or polypropylene are not used. Furthermore, standardized and proven materials can be used.

The advantage according to the invention, of excellent adhesion which is not lost even during thermoforming with steam, must be emphasized in particular.

In this respect, the embodiments containing as adhesion-promoting molding compounds the polyamide mixtures described are particularly durable.

Moreover, by steam thermoforming a further advantage is attained: the multilayer pipes become more flexible, thus are more readily installed. True, this effect is already known from similarly constituted multilayer films of DE 198 06 468 A1, but a multilayer composite having the layer sequence according to the present invention is not disclosed there.

However, it is surprising to find that at multilayer pipes according to the invention which were thermoformed with steam, no deterioration of the barrier properties (permeation) is measured when steam thermoforming is conducted under the usual practical conditions, that is no longer than 5 min at no more than 150° C. This could not have been expected on the basis of the statement concerning the barrier action of EVAL under the influence of water made in the Kunststoff Taschenbuch (Saechtling) cited at the outset.

It should finally be pointed out that the problems of EVOH mentioned when appreciating the state of the art, viz., its fragility and susceptibility to tension cracks, did not become apparent in the present invention. This appears to be due to the very good embedding in the multilayer composite according to the invention, i.e. to the excellent adhesion to both of the adjacent polyamide layers, which provide optimum support to the EVOH layer.

The foregoing description of the specific embodiments will so fully reveal the general nature of the invention that others can, by applying current knowledge, readily modify and/or adapt for various applications such specific embodiments without undue experimentation and without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. The means, materials, and steps for carrying out various disclosed functions may take a variety of alternative forms without departing from the invention.

Thus the expressions "means to . . . " and "means for . . . ", or any method step language, as may be found in the specification above and/or in the claims below, followed by a functional statement, are intended to define and cover whatever structural, physical, chemical or electrical element or structure, or whatever method step, which may now or in the future exist which carries out the recited function, whether or not precisely equivalent to the embodiment or embodiments disclosed in the specification above, i.e., other means or steps for carrying out the same functions can be used; and it is intended that such expressions be given their broadest interpretation.

What is claimed is:

1. In a thermoplastic multilayer composite containing
   at least one intermediate layer made from a molding compound on the basis of ethylene/vinyl alcohol copolymers, between layers made from molding compounds on the basis of polyamide, as well as at least on one side of the intermediate layer an adjacent layer made from a molding compound on the basis of polyamide 12, polyamide 11, polyamide 1010, polyamide 1012, or polyamide 1212,
   the improvement wherein, between the intermediate layer and the at least one adjacent layer, an adhesion-promoting layer is provided which is made from a molding compound on the basis of polyamide selected from the group consisting of copolyamide 6/12 with 60 to 80% by weight of polyamide 6 fraction, block copolyamide 6/12, polyamide 612, polyamide 610, a mixture of polyamide 6 with polyamide 12 and a compatibilizer, and a mixture of polyamide 6 with polyamide 11 and a compatibilizer,
   wherein the quantity of polyamide in the adhesion-promoting layer is at least 60% by weight.

2. A thermoplastic mulitlayer composite according to claim 1, wherein the intermediate layer of ethylene/vinyl alcohol copolymers is bonded on both sides to adjacent layers via adhesion-promoting layers.

3. A thermoplastic multilayer composite according to claim 1 in the form of a multilayer hose, a multilayer pipe which, optionally, has a corrugated wall at least in some sections, or a multilayer container.

4. A thermoplastic multilayer composite according to claim 1, wherein said adhesion promoting layer is copolyamide 6/12 with 65 to 80% by weight of polyamide 6 fraction.

5. A thermoplastic multilayer composite according to claim 1, wherein the quantity of polyamide in the adhesion-promoting layer is at least 70% by weight.

6. The thermoplastic multilayer composite according to claim 1, wherein
   a polyamide mixture of polyamide 6, polyamide 12, and a compatibilizer with a polyamide 6 content between 25 and 60 parts by weight, based on 100 parts by weight of the two polyamide components in the mixture, or a polyamide mixture of polyamide 6, polyamide 11, and a compatibilizer with a polyamide 6 content between 25 and 80 parts by weight, based on 100 parts by weight of the two polyamide components in the mixture,
   is used as the molding compound for the adhesion-promoting layer.

7. The thermoplastic multilayer composite according to claim 6, wherein the compatibilizer in the polyamide mixture is an impact modifier used to improve the toughness of polyamides, and the compatibilizer is present in the polyamide mixture in an amount of up to 30% by weight.

8. The composite of claim 7, wherein said impact modifier is an elastomer.

9. The composite of claim 8, wherein the elastomer is an ethylene/α-olefin copolymer comprising acid or acid anhydride groups.

10. The thermoplastic multilayer composite according to claim 1, wherein the ethylene/vinyl alcohol copolymer layer or one of the polyamide layers is filled with layer silicates in an amount of 0.5 to 50 parts by weight per 100 parts by weight of the polymer matrix.

11. The thermoplastic multilayer composite according to claim 1 comprising
   (a) an inner layer made of a molding compound on the basis of polyamide 6, polyamide 46, polyamide 66, polyamide 69, polyamide 610, or polyamide 612,
   (b) an intermediate layer made of a molding compound on the basis of ethylene/vinyl alcohol copolymers,
   (c) an adhesion-promoting layer disposed between the intermediate layer (b) and an outer layer (d) and adjoining them, and made of a molding compound on the basis of polyamide selected from the group of copolyamide 6/12 with 60 to 80% by weight of polyamide 6 fraction, block copolyamide 6/12, polyamide 612, polyamide 610, a mixture of polyamide 6 and polyamide 12 with compatibilizer and having a polyamide 6 content of 25 to 80 parts by weight based on 100 parts by weight of the two polyamide components in the mixture, a mixture of polyamide 6 and polyamide 11 with compatibilizer and having a polyamide 6 content of 25 to 80 parts by weight, based on 100 parts by weight of the two polyamide components in the mixture, and
   (d) said outer layer made of a molding compound on the basis of polyamide 12 or polyamide 11.

12. The thermoplastic multilayer composite according to claim 11, wherein the inner layer (a) or an additional, innermost layer on the basis of the polyamides of layer (a) contains additives making it electric conductive, optionally with carbon fibers and/or conducting carbon black.

13. The thermoplastic multilayer composite according to claim 3, wherein the multilayer pipe is a fuel line.

14. A method for producing a thermoplastic multilayer composite according to claim 1 in one or several steps, by injection molding, coextrusion, extrusion blow molding, pressing, or by the casing process.

15. The thermoplastic multi-layer composite of claim 5, wherein the quantity of polyamide in the adhesion-promoting layer is at least 80% by weight.

* * * * *